United States Patent [19]

Llamas Llamas et al.

[11] Patent Number: 4,975,646

[45] Date of Patent: Dec. 4, 1990

[54] DETECTOR SYSTEM FOR RECOGNIZING A MAGNETIC MATERIAL

[76] Inventors: Francisco J. Llamas Llamas, Calle Salvador Dali Nro 3; Francisco J. Gosalbez Gosalves, Calle Chile Nro 5, both of Madrid, Spain

[21] Appl. No.: 297,299

[22] Filed: Jan. 13, 1989

[30] Foreign Application Priority Data

Jan. 15, 1988 [ES] Spain .................................. 8800087

[51] Int. Cl.⁵ ........................ G01V 3/08; G01R 33/14
[52] U.S. Cl. .................................... 324/328; 324/232
[58] Field of Search ............... 324/232, 233, 234, 236, 324/237, 238, 239, 240, 241, 242, 243, 227, 226, 225, 326–329

[56] References Cited

U.S. PATENT DOCUMENTS 3,686,564  8/1972  Mallick, Jr. et al. ............... 324/232
4,303,885 12/1981  Davis et al. ...................... 324/232 X
4,629,985 12/1986  Papadimitriou et al. ........... 324/232

FOREIGN PATENT DOCUMENTS 57-187650 11/1982  Japan .................................. 324/232
59-183359 10/1984  Japan .................................. 324/232
 1-47944  2/1989  Japan .................................. 324/232

Primary Examiner—Reinhard J. Eisenzopf
Assistant Examiner—Warren S. Edmonds
Attorney, Agent, or Firm—Darby & Darby

[57] ABSTRACT

An assembly formed by an electronic circuit in which a microprocessor is included that emits a signal from which additional signals are generated by a frequency synthesizer. These signals are applied to coils which form the emitting antenna, after being filtered and amplified. From these signals, the sample signal is generated and is picked up by other receiving antennas. After being amplified and filtered and all the distortion elements removed, the picked up signals are applied to proper frequency filters to obtain at the output signals having amplitudes proportional to those generated in the sample.

10 Claims, 2 Drawing Sheets

DETECTOR SYSTEM FOR RECOGNIZING A MAGNETIC MATERIAL

FIELD OF THE INVENTION

The present invention relates to systems utilizing electromagnetic radiation to detect magnetic materials.

BACKGROUND OF THE INVENTION

At present there are numerous metal detecting devices having transmitters and receivers duly adjusted to emit and receive signals which, through the emission of a magnetic field, receive the corresponding signals of the magnetic material sought to be detected. However, they are essentially dedicated to the same type of magnetic material, without any possibility of detecting those that, owing to their different hysteresis cycles, are beyond the reach of the detector used.

An example of a prior art system which has a frequency synthesizer is found in U.S. Pat. No. 4,303,885. The frequency synthesizer is responsive to digital control signals applied along a control buss to generate a square wave at a frequency determined by the digital command. The square wave is filtered into sinusoidal signals which is sent to excite coils.

In order to eliminate this inconvenience and to distinguish different magnetic materials with different hysteresis cycles, the system of the present invention has been developed. This system utilizes the emission of two different frequency magnetic fields at proper amplitude. As a result, it is possible to operate in the non-linear area of the hysteresis cycle to produce a frequency beat to obtain, depending on the actual material hysteresis cycle and additional factors, an amplitude of the product obtained by the above frequency beat.

A further survey of the amplitude and its relationship to the product will distinguish the different materials detected with different hysteresis cycles.

Consequently the system comprises a transmitter, a receiver and an electronic assembly. The transmitter is formed with one or more coils in arrangement and number depending on the application. The receiver has one or more pairs of coils and the electronic circuit has a microprocessor which provides the signal from which the remaining required signals are generated. At the same time the microprocessor processes the signal received and the result of this process is provided as an output to an external indicator.

Of the above signals, two of them are conveniently filtered and amplified and are utilized to provide to the transmitting coils the current required for the emission of the previously established magnetic fields. The other signal controls the different central or cut-off frequencies of the different filters. In these filters, the signals received by the antenna are processed, amplified and filtered in such a way that, when they are transferred to the microprocessor, the analysis thereof is produced and the corresponding result is provided on an external indicator.

This system therefore allows the operations that the existing systems cannot perform, such as: the possibility of detecting materials containing magnetically soft materials such as permalloy, micro-metal, metals, etc. with low transmission frequencies; and choosing among materials with close values to study the products providing signal amplitude with these values, which allows the reduction of the field by limiting the materials to be detected to those presenting different hysteresis cycles.

Below, a detailed description of the material detecting system is provided, with reference to an illustrative embodiment, subject to all those detailed modifications which do not fundamentally alter the essential characteristics thereof, as defined in the claims.

BRIEF DESCRIPTION OF THE DRAWINGS

For a clearer exposition thereof, the illustrative embodiment is accompanied by the accompanying drawings in which.

DETAILED DESCRIPTION

Figure 1:
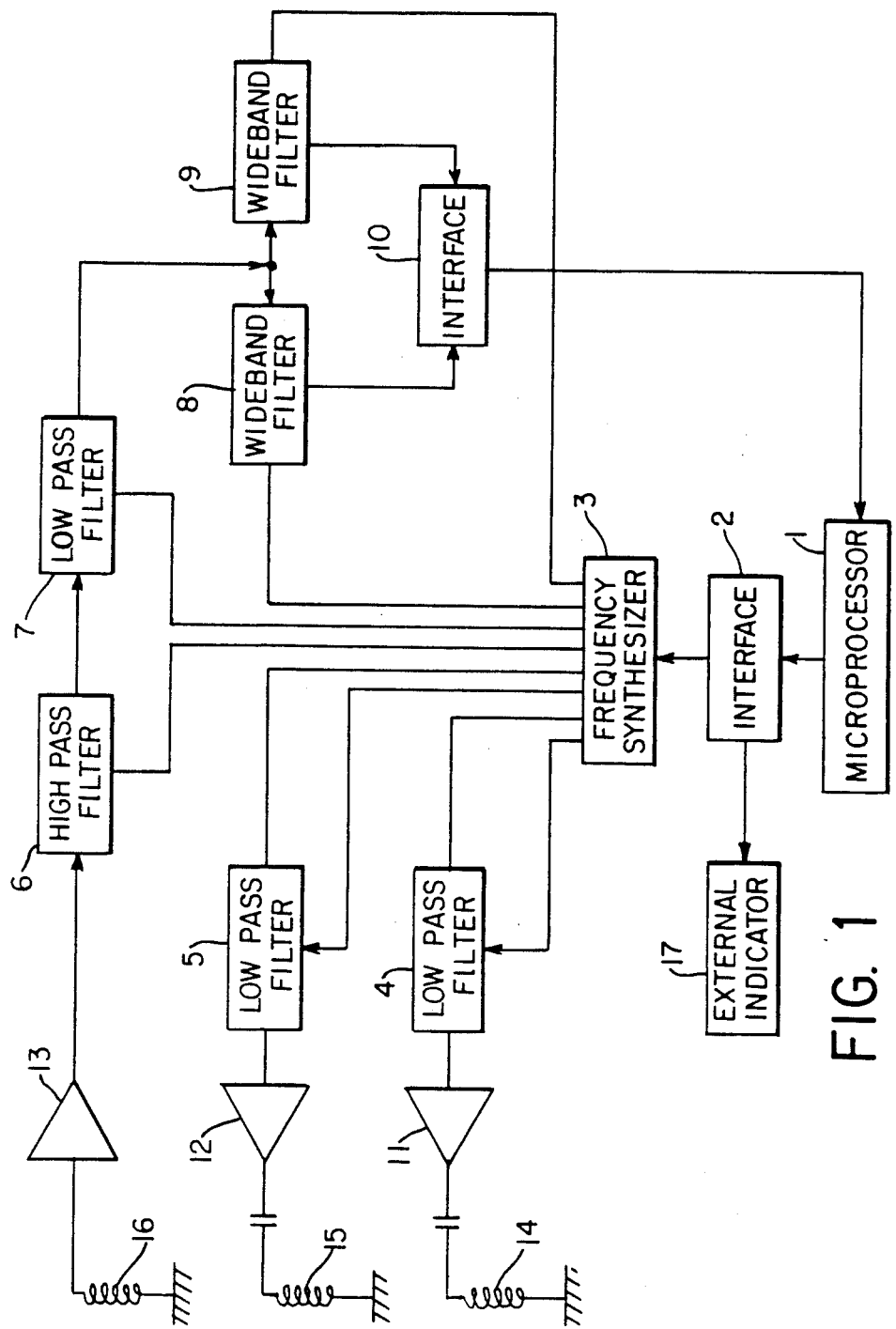
FIG. 1 is a block diagram of the system assembly.

According to the preferred embodiment, the system comprises an electronic circuit in which a microprocessor 1 emits a signal of a certain frequency to an interface 2 and from this to a frequency synthesizer 3, formed by a series of elements with programmable and controllable dividers operated by the microprocessor 1. From this synthesizer 3 the signals go to respective low pass filters 4 and 5 placed ahead of power amplifiers 11 and 12, which supply the necessary current to the coils 14 and 15 of the emitting antenna.

Of the above signals, one of them is the emission frequency signal and the others are the control frequencies of the filter cut-out frequency, as every filter used is of commuted capacity.

The signals which are emitted by the emitting antennas 14 and 15 produce the signal in the sample received by the receiving antenna formed by the coil 16. After being amplified in amplifier 13 and filtered by the high pass filter 6 and a low pass filter 7, this signal is sent to other bandpass and wideband filters 8 and 9 of the proper frequency, together with a control frequency suitable for the frequency used at the signal emission. At the filter outputs an amplitude signal proportional to the signals developed in the sample is obtained. These signals pass on to the interface 10 from where they are sent to the microprocessor for analysis and the relevant result is shown on the external indicator 17.

Figure 2:
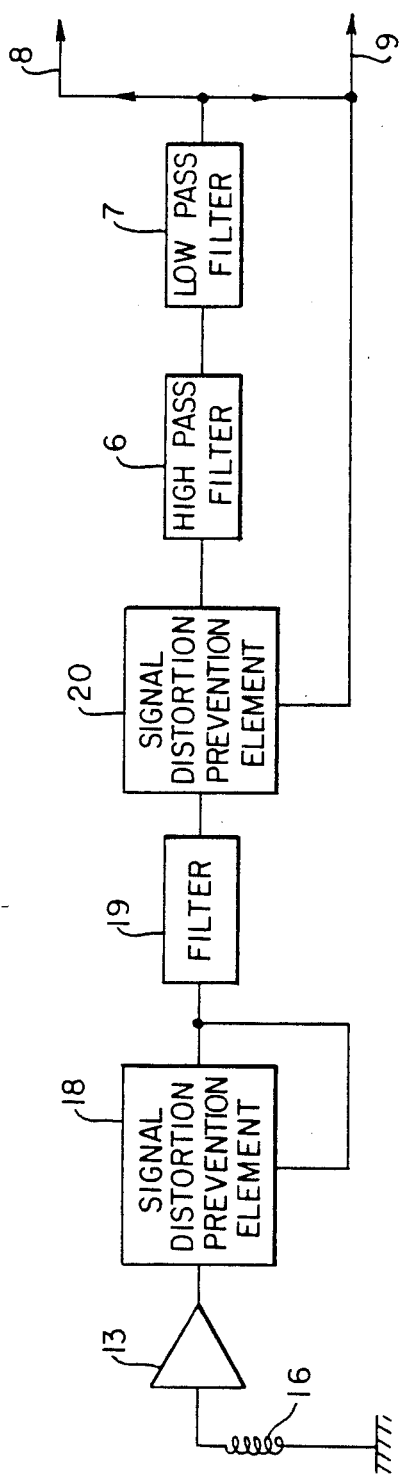
FIG. 2 is a block diagram detailing the reception stage.

Preferably, the reception stage has more elements such as detailed in FIG. 2. This is because, despite balancing the antenna mechanically and electronically to obtain the minimum of the signals transmitted by the receiving antenna 16, after amplifier 13 an element 18 is provided to prevent signal distortion in later stages, with the consequent inaccuracy or error of the result. Then, follow a filter 19, the frequency of which is among those used at the emission in order to attenuate these frequencies, and a second element 20 similar to the previous one, which receives feedback from the receiver output. Here, follows filter 6, already described with respect to FIG. 1, and the other above-mentioned stages.

The frequency will be chosen as a function of the noise existing at the site of the system. Normally, it will be between 200 and 300 Hz, selected so that the emission frequencies are sufficiently separated from the normal frequencies in the network to avoid interferences distorting the results.

Those skilled in the art will appreciate that many additions, modifications and substitutions are possible without departing from the scope or spirit of the invention as defined in the accompanying claims.

We claim:

1. A detector system for recognizing a magnetic material of a sample, comprising:
   means for emitting two different frequency magnetic fields at the sample, said fields having respective frequencies which are different from each other and which generate a signal in the sample;
   means for receiving said signal to produce a frequency beat which is enabled by a non-linear area of a hysteresis cycle of the magnetic material;
   means for obtaining an amplitude of the sample with respect to the hysteresis cycle of the magnetic material based on the signal as received by said receiving means;
   means for analyzing said amplitude of the sample to produce a result indicative of the magnetic material so as to be distinguishable from that for other different magnetic materials that have different hysteresis cycles; and
   means for indicating said result.

2. A detector system according to claim 1, wherein said emitting means includes transmitters, said receiving means includes a receiver with at least one coil, said obtaining means includes an electric circuit with means for generating an emission frequency signal to said transmitters, said indicating means being driven by said electric circuit.

3. A detector system according to claim 2, wherein said analyzing means includes a microprocessor.

4. A detector system according to claim 3, further comprising an interface device to which the microprocessor sends a certain frequency signal, a frequency synthesizer having programmable and controllable dividers operated by the microprocessor so that two output signals are produced by the synthesizer, and low pass filters operating on the synthesizer output signals and frequency amplifiers each receiving one of the filtered synthesizer output signals which supply at least one transmitter coil the currents required.

5. A detector system according to claim 1, further comprising receiving antenna means for picking up the signals in the sample, means for amplifying and filtering connected to said antenna means, a second filter connected to said amplifying and filtering means and having a pass frequency which enables obtaining at an output thereof amplitude signals proportional to those generated in the sample, and means coupling said amplitude signals to the microprocessor, where they are analyzed, the results being shown in the indicator.

6. A detector system for magnetic materials according to claim 4, further comprising receiving antenna means for picking up the signals in the sample, means for amplifying and filtering connected to said antenna means, a second filter connected to said amplifying and filtering means and having a pass frequency suitable to obtain at an output thereof amplitude signals proportional to those generated in the sample, and means coupling said amplitude signals to the microprocessor, where they are analyzed, the results being shown in the indicator.

7. A detector system according to claim 6, further comprising at the reception stage after the amplifier means first filter means for preventing signal distortion, the frequency of which is among those used for the emission and a second filter means similar to the first for receiving feedback from the receiver output, an output signal therefrom entering into the final stage without any distortion of a type that can misrepresent the results obtained.

8. A detector system according to claim 5, further comprising receiving antenna means for picking up the signals in the sample, means for amplifying and filtering connected to said antenna means, a second filter connected to said amplifying and filtering means and having a pass frequency suitable to obtain at an output thereof amplitude signals proportional to those generated in the sample, and means coupling said amplitude signals to the analyzing means, where they are analyzed, the results being shown in the indicator.

9. A detector system according to claim 8, further comprising at the reception stage after the amplifier means first filter means for preventing signal distortion, the frequency of which is among those used for the emission and a second filter means similar to the first for receiving feedback from the receiver output, an output signal therefrom entering into the final stage without any distortion of a type that can misrepresent the results obtained.

10. A detector system according to claim 1, further comprising at the reception stage after the amplifier means first filter means for preventing signal distortion, the frequency of which is among those used for the emission and a second filter means similar to the first for receiving feedback from the receiver output, an output signal therefrom entering into the final stage without any distortion of a type that can misrepresent the results obtained.

* * * * *